(12) United States Patent
Saito

(10) Patent No.: US 7,706,083 B2
(45) Date of Patent: Apr. 27, 2010

(54) DRIVE MECHANISM

(75) Inventor: Noboru Saito, Saitama (JP)

(73) Assignee: Hoya Corporation, Tokyo (JP)

( * ) Notice: Subject to any disclaimer, the term of this patent is extended or adjusted under 35 U.S.C. 154(b) by 821 days.

(21) Appl. No.: 11/412,136

(22) Filed: Apr. 27, 2006

(65) Prior Publication Data

US 2006/0245309 A1 Nov. 2, 2006

(30) Foreign Application Priority Data

Apr. 28, 2005 (JP) ............................. 2005-132465

(51) Int. Cl.
*G02B 7/04* (2006.01)
*G02B 7/10* (2006.01)

(52) U.S. Cl. .................. 359/694; 359/696; 359/823; 74/89.23; 74/89.42; 74/424.71; 74/441

(58) Field of Classification Search ............. 74/424.71, 74/424.78, 424.79, 441, 89.23, 89.42, 409; 359/694–701, 819–823; 384/26, 29, 31, 384/32, 42

See application file for complete search history.

(56) References Cited

U.S. PATENT DOCUMENTS

| 4,279,173 | A | * | 7/1981 | Krebs et al. | ................... | 74/441 |
| 4,636,106 | A | * | 1/1987 | Waisbrod | ................... | 403/228 |
| 5,150,260 | A | * | 9/1992 | Chigira | ....................... | 359/694 |
| 5,391,866 | A | * | 2/1995 | Hoshino et al. | .......... | 250/201.2 |
| 5,737,644 | A | | 4/1998 | Nomura et al. | | |
| 5,748,394 | A | * | 5/1998 | Shimazaki et al. | .......... | 359/823 |
| 6,434,334 | B2 | * | 8/2002 | Ichinokawa | ................. | 396/144 |
| 2005/0168847 | A1 | * | 8/2005 | Sasaki | ........................ | 359/823 |
| 2006/0127072 | A1 | | 6/2006 | Seo | | |

FOREIGN PATENT DOCUMENTS

JP        07043583 A  *  2/1995
JP        2003-195144    7/2003

* cited by examiner

*Primary Examiner*—Richard W L Ridley
*Assistant Examiner*—Thomas Diaz
(74) *Attorney, Agent, or Firm*—Greenblum & Bernstein P.L.C.

(57) ABSTRACT

A drive mechanism include a movable element which has at least one bearing arm; a linear guide shaft for linearly guiding the movable element without rotating; a driving device driving the movable element linearly along the linear guide shaft; a driven member driven, by the driving device, in a direction parallel to the linear guide shaft; a first guide hole formed on the bearing arm; a second guide hole formed on the driven member, the first and second guide holes being identical in size and in cross sectional shape; a tubular bearing member fitted into the first and second guide holes, the linear guide shaft being fitted completely through the tubular bearing member to be freely slidable therein; and a retaining device formed on the tubular bearing member and the driven member to prevent the tubular bearing member from moving relative to the driven member.

11 Claims, 15 Drawing Sheets

DRIVE MECHANISM

BACKGROUND OF THE INVENTION

1. Field of the Invention

The present invention relates to a drive mechanism for driving a movable element linearly along at least one guide shaft.

2. Description of the Related Art

A typical drive mechanism serving as a lens drive mechanism for linearly driving a movable lens includes a lens support frame which holds a lens element and has a pair of bearing arms separate from each other in a direction parallel to the optical axis of the lens; a rack-incorporated member including an engaging portion that is engaged between the pair of bearing arms to be movable relative to the pair of bearing arms in a direction parallel to the optical axis of the lens; a guide shaft which passes through two guide holes formed on the pair of bearing arms, respectively, and further passes through a guide hole formed on the engaging portion of the rack-incorporated member, wherein the two guide holes of the pair of bearing arms and the guide hole of the engaging portion are aligned in a direction parallel to the optical axis of the lens element so that the lens support frame and the rack-incorporated member are linearly guided in the direction of the optical axis of the lens element while being prevented from rotating about the optical axis of the lens element; and a lead screw which extends parallel to the guide shaft, and meshes with teeth formed on the rack-incorporated member, wherein a rotation of the lead screw on its axis causes the rack-incorporated member and the lens support frame to move together in the direction of the optical axis of the lens.

This type of drive mechanism is disclosed in Japanese unexamined patent publication No. 2003-195144.

However, in this lens drive mechanism that is disclosed in Japanese unexamined patent publication No. 2003-195144, backlash occurs between the lens support frame and the rack-incorporated member, which causes a difference in attitude between the lens support frame and the rack-incorporated member relative to the optical axis of the lens element. This difference in attitude becomes a cause of decentering and tilting of the optical axis of the lens element, thus resulting in a deterioration of the optical performance and making it difficult for a position detector to detect the origin point of the lens support frame (the lens element held in the lens support frame).

SUMMARY OF THE INVENTION

The present invention provides a drive mechanism in which no backlash occurs between a movable element (e.g., the aforementioned lens support frame) and a driven member (e.g., the aforementioned rack-incorporated member).

According to an aspect of the present invention, a drive mechanism is provided, including a movable element which has at least one bearing arm; a linear guide shaft for linearly guiding the movable element without rotating; a driving device which drives the movable element linearly along the linear guide shaft; a driven member which is driven, by the driving device, in a direction parallel to the linear guide shaft; a first guide hole formed on the bearing arm; a second guide hole formed on the driven member, the first guide hole and the second guide hole being identical in size and in cross sectional shape; a tubular bearing member fitted into the first guide hole and the second guide hole, the linear guide shaft being fitted completely through the tubular bearing member to be freely slidable therein; and a retaining device formed on the tubular bearing member and the driven member to prevent the tubular bearing member from moving relative to the driven member.

It is desirable for the movable element to include a lens support frame which supports at least one lens element.

It is desirable for the bearing arm to include a pair of bearing arms which are formed on the lens support frame and are separate from each other in a direction parallel to an optical axis of the lens element. The driving device includes a lead screw which extends parallel to the linear guide shaft and which rotates on an axis of the lead screw. The driven member includes a rack-incorporated member which includes an engaging portion positioned between the pair of bearing arms and a rack portion which is in mesh with the lead screw. The first guide hole includes two first guide holes which are formed on the pair of bearing arms, respectively, and the second guide hole is formed on the engaging portion of the rack-incorporated member, the two first guide holes and the second guide hole being aligned in the direction parallel to the optical axis. The tubular bearing member is fitted into the two first guide holes and the second guide hole.

It is desirable for the retaining device to include a contacting portion, formed on the tubular bearing member, which comes in contact with the bearing arm on a side opposite from the driven member; an engaging recess formed on an outer peripheral surface of the tubular bearing member; and a retaining projection formed on the driven member which engages with the engaging recess so that the tubular bearing member is prevented from moving relative to the driven member in the direction of the linear guide shaft.

It is desirable for the engaging recess of the tubular bearing member to be formed around the outer peripheral surface of the tubular bearing member as an annular groove having a center thereof on an axis of the tubular bearing member.

It is desirable for the retaining device to include a contacting portion formed on the tubular bearing member which comes in contact with the bearing arm on the side opposite from the driven member; and an engaging lug formed on the driven member and engaged with the contacting portion on the side opposite from the bearing arm.

The tubular bearing member can be made of metal or synthetic resin.

It is desirable for the bearing arm to include a pair of bearing arms which are formed on the lens support frame and are separate from each other in a direction parallel to an optical axis of the lens element. The driving device includes a lead screw which extends parallel to the linear guide shaft and which rotates on an axis of the lead screw. The driven member includes a rack-incorporated member which includes an engaging portion positioned between the pair of bearing arms and a rack portion which is in mesh with the lead screw. The first guide hole includes two first guide holes which are formed on the pair of bearing arms, respectively, and the second guide hole is formed on the engaging portion of the rack-incorporated member, the two first guide holes and the second guide hole being aligned in the optical axis direction. The tubular bearing member is fitted into the two first guide holes and the second guide hole. The rack-incorporated member includes a resiliently deformable portion which is resiliently deformable in a radial direction of the tubular bearing member and which is exposed at an outer surface of the rack-incorporated member. The retaining projection is formed on a surface of the resiliently deformable portion which faces the tubular bearing member.

It is desirable for the bearing arm to include a pair of bearing arms which are formed on the lens support frame and are separate from each other in a direction parallel to an optical axis of the lens element. The driving device includes a lead screw which extends parallel to the linear guide shaft and which rotates on an axis of the lead screw. The driven member includes a rack-incorporated member which includes an engaging portion positioned between the pair of bearing arms and a rack portion which is in mesh with the lead screw. The first guide hole includes two first guide holes which are formed on the pair of bearing arms, respectively, and the second guide hole is formed on the engaging portion of the rack-incorporated member, the two first guide holes and the second guide hole being aligned in the direction parallel to the optical axis. The tubular bearing member is fitted into the two first guide holes and the second guide hole. The rack portion of the rack-incorporated member has a U-shape in cross section so as to have two parallel plate portions which hold the lead screw therebetween. The lead screw gears with teeth are formed on at least one of inner surfaces of the two parallel plate portions which face each other.

It is desirable for the linear guide shaft to include a pair of linear guide shafts parallel to each other.

It is desirable for the driving device to include a motor for rotating the lead screw.

It is desirable for the driven member to include a resilient tongue formed on one of the two parallel plate portions which presses the lead screw toward the other of the two parallel plate portions on which the teeth are formed to bring tooth flanks of the teeth and screw thread faces of the lead screw into intimate contact with each other.

It is desirable for the drive mechanism to be incorporated in a photographing lens barrel.

It is desirable for the contacting portion to include an annular flange which projects radially outwards from one end of the tubular bearing member.

In an embodiment, a drive mechanism is provided, including a movable element which has at least one bearing arm; a linear guide shaft for linearly guiding the movable element without rotating; a driving device which drives the movable element linearly along the linear guide shaft; a driven member which is driven, by the driving device, in a direction parallel to the linear guide shaft; a first guide hole formed on the bearing arm; a second guide hole formed on the driven member, the first guide hole and the second guide hole being identical in size and in cross sectional shape; a tubular bearing member fitted into the first guide hole and the second guide hole, the linear guide shaft being fitted completely through the tubular bearing member to be freely slidable therein; and a retaining device formed on the driven member and the bearing arm to prevent the driven member from moving relative to the bearing arm.

The retaining device can include a retaining pawl provided on a front surface of the bearing arm; and an engaging projection provided on the driven member, wherein a rear surface of the retaining pawl abuts against the engaging projection in a state where a rear surface of the driven member abuts against a front surface of the bearing arm.

The retaining device can include a retaining pawl provided on a front surface of the bearing arm; and an engaging recess formed in the driven member, wherein the retaining pawl is engaged in the engaging recess. The length of the engaging recess in a direction parallel to an axis of the linear guide shaft is the same as that of the retaining pawl.

According to the present invention, a drive mechanism in which no backlash occurs between the movable element (e.g., the lens support frame) and the driven member (e.g., the rack-incorporated member) is achieved.

The present disclosure relates to subject matter contained in Japanese Patent Application No. 2005-132465 (filed on Apr. 28, 2005) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENTS

Figure 1:
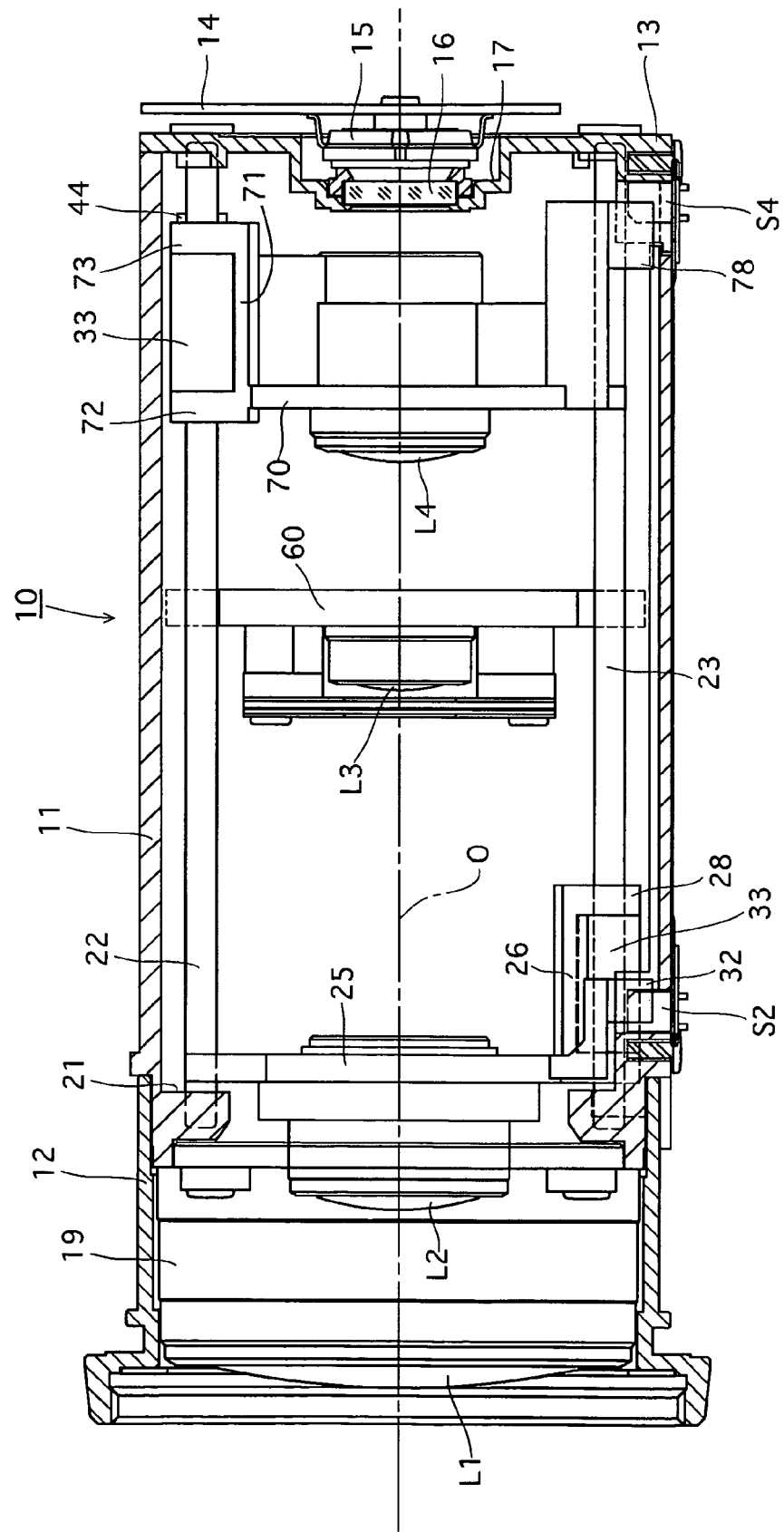
FIG. 1 is a longitudinal sectional view of a first embodiment of a lens barrel to which a first embodiment of a lens drive mechanism is applied, according to the present invention.

A lens barrel having a first embodiment of a lens drive mechanism to which the present invention is applied will be hereinafter discussed with reference to FIGS. 1 through 10.

A lens barrel 10 is an internal focusing type of lens barrel which is incorporated in a camera. The lens barrel 10 is provided with a photographing optical system having four lens groups: first through fourth lens groups L1, L2, L3 and L4. The lens barrel 10 is provided with a first cylindrical case 11 and a second cylindrical case 12 which is fitted on the front end of the first cylindrical case 11 and fixed thereto. The rear open end of the first cylindrical case 11 is closed by a back plate 13 having a circular shape as viewed from the front thereof (from the left as viewed in FIG. 1). A CCD support plate 14 is positioned behind the rear plate 13. A CCD 15 and an optical low-pass filter 16 are fixed to a front surface of the CCD support plate 14 to be positioned in an accommodation recess 17 formed on a rear surface of the back plate 13. The lens barrel 10 is provided therein with a first-lens-group support frame 19 which supports the first lens group L1. The first-lens-group support frame 19 is fitted into a front end portion of the first cylindrical case 11 to be fixed thereto. The first cylindrical case 11 is provided at the front end thereof with an integrally-molded inner annular flange 21 which projects radially inwards from an inner peripheral surface of the first cylindrical case 11. The lens barrel 10 is provided with two guide shafts (linear guide shafts) 22 and 23 which extend parallel to an optical axis O of the photographing optical system. Front ends and rear ends of the two guide shafts 22 and 23 are fixed to the rear surface of the inner annular flange 21 and the front surface of the back plate 13 to be immovably supported thereby, respectively. The guide shafts 22 and 23 have the same dimensions, each having a cylindrical columnar shape having a uniform diameter along the entire length thereof.

Figure 2:
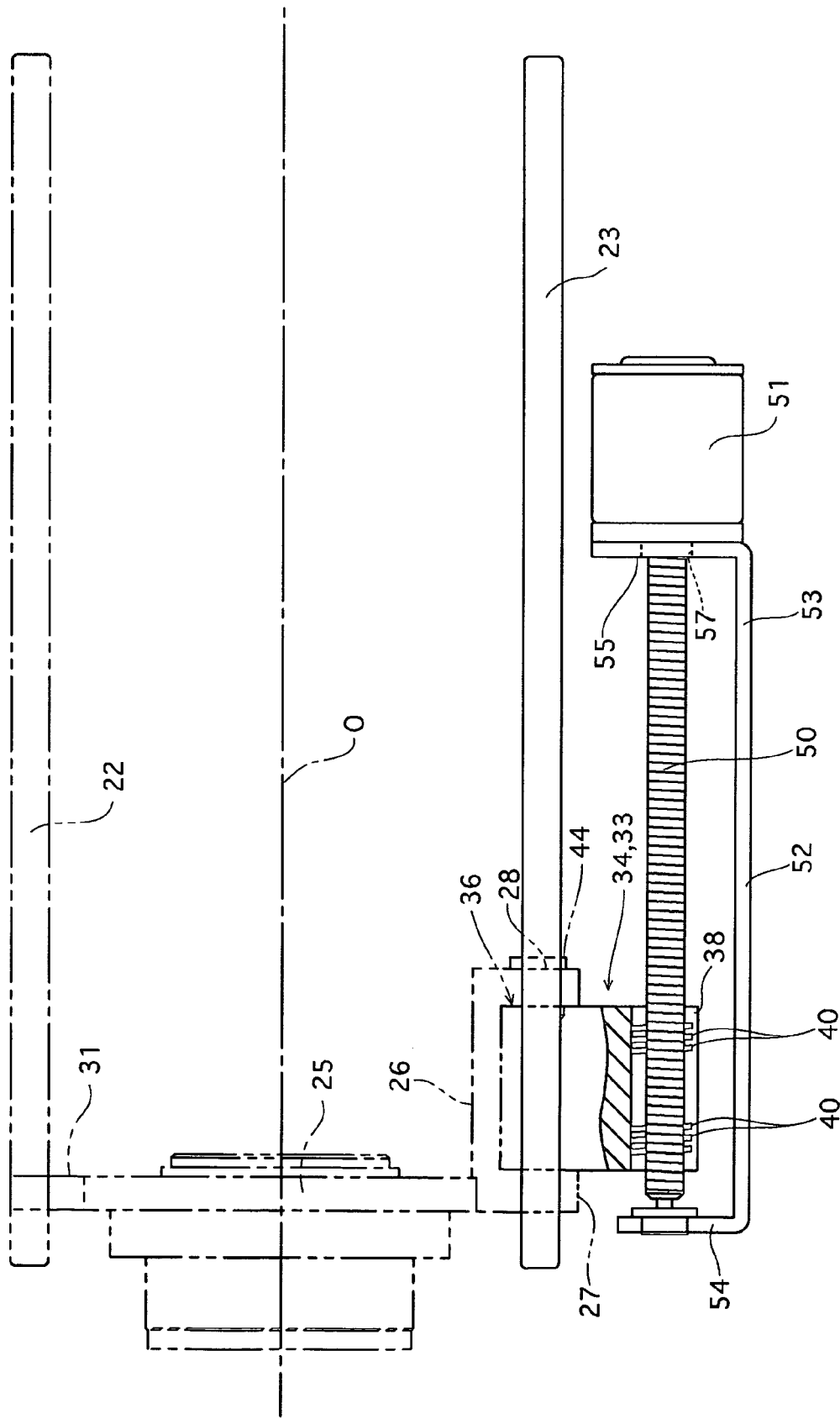
FIG. 2 is a longitudinal sectional view of a second-lens-group support frame and a drive mechanism therefor in the lens barrel shown in FIG. 1.
Figure 3:
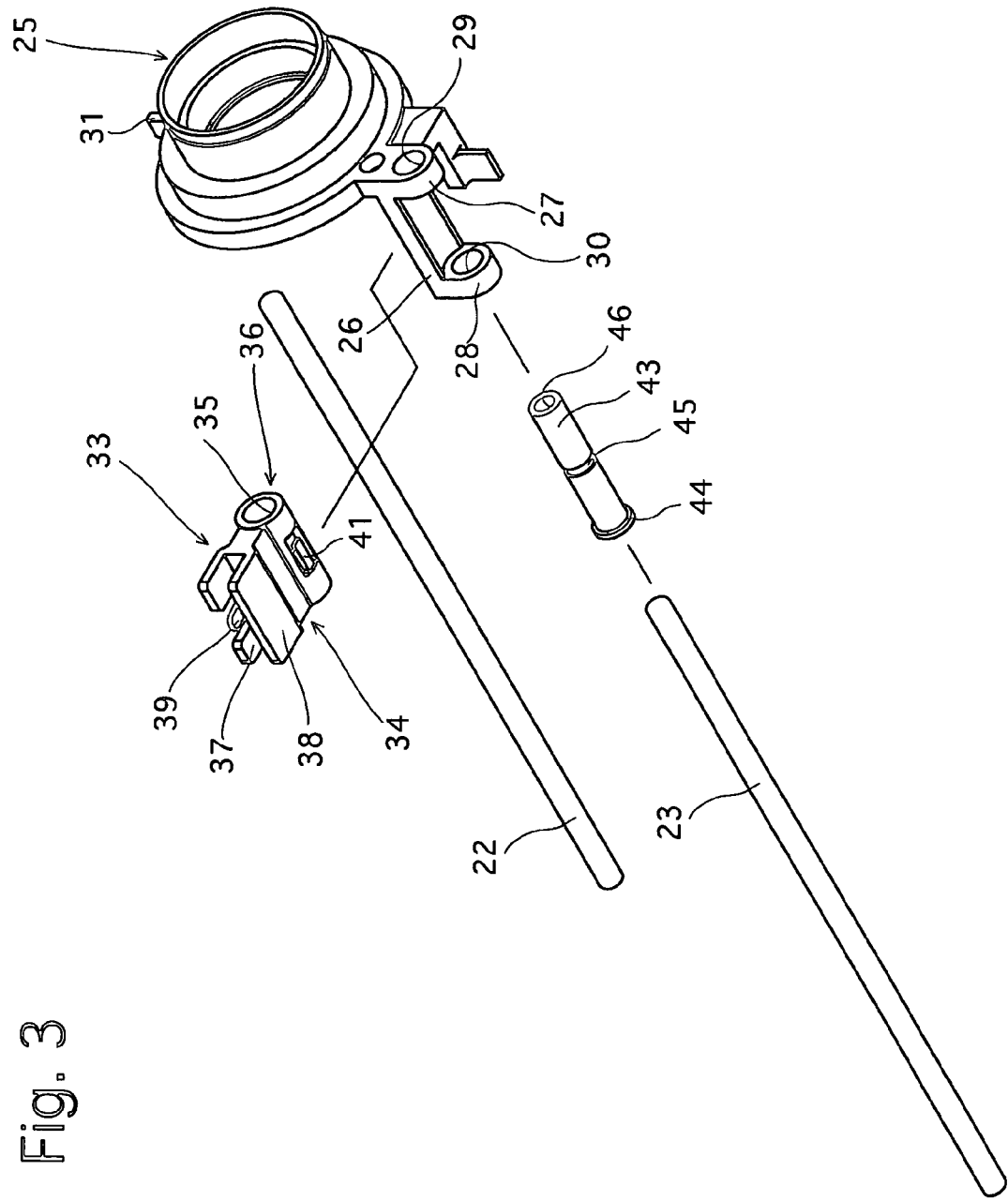
FIG. 3 is an exploded perspective view of the second-lens-group support frame and the drive mechanism therefor in the lens barrel shown in FIG. 1.
Figure 4:
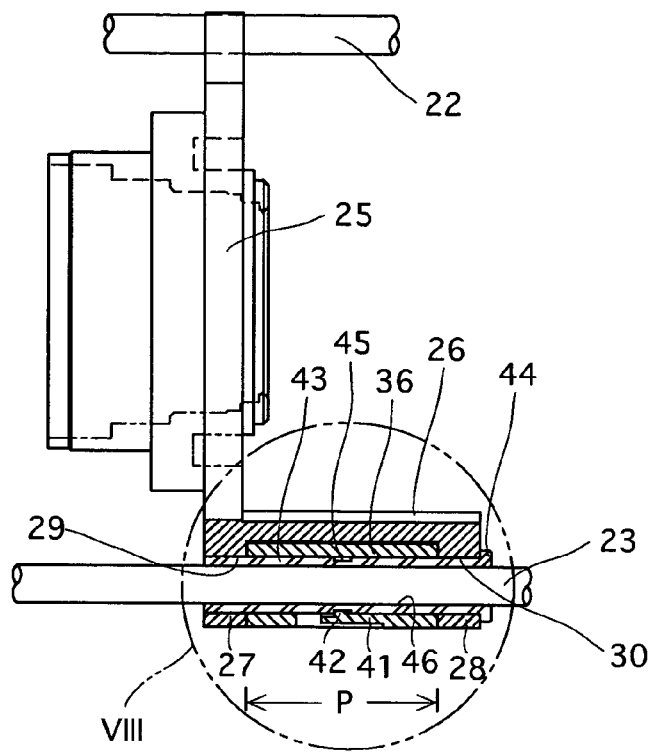
FIG. 4 is a side elevational view of the second-lens-group support frame and a portion of the drive mechanism that are shown in FIGS. 2 and 3, showing a relationship between the second-lens-group support frame and guide shafts of the drive mechanism.
Figure 10:
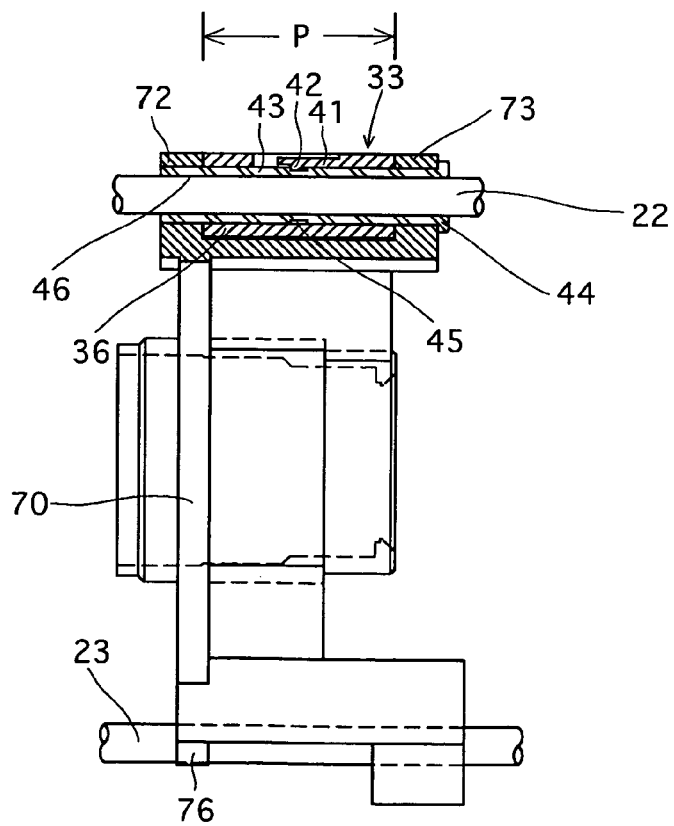
FIG. 10 is a side elevational view of the fourth-lens-group support frame and a portion of the drive mechanism that are shown in FIG. 9, showing a relationship between the fourth-lens-group support frame and the guide shafts of the drive mechanism.

The lens barrel 10 is provided therein with a second-lens-group support frame (movable element) 25 which supports the second lens group L2. The second-lens-group support frame 25 is molded from synthetic resin by integral molding. The second-lens-group support frame 25 is supported by the two guide shafts 22 and 23 to be guided linearly in a forward/rearward direction along the optical axis O without rotating about the optical axis O. As best shown in FIG. 3, the second-lens-group support frame 25 is provided with a support arm 26 which projects rearwards from an outer edge of the second-lens-group support frame 25 in a direction parallel to the optical axis O. The second-lens-group support frame 25 is provided on the support arm 26 with a pair of bearing arms 27 and 28 which are separate from each other in the optical axis direction (the direction of the optical axis O) by a distance (inside distance) P (see FIG. 4). The pair of bearing arms 27 and 28 are provided with a front insertion hole (guide hole) 29 and a rear insertion hole (guide hole) 30 which are formed as through-holes to be aligned in a direction parallel to the optical axis O. The second-lens-group support frame 25 is provided on a radially opposite side from the support arm 26 with respect to the optical axis O with a bifurcated projection 31 (see FIGS. 2 and 3) which is similar in shape to a bifurcated projection 76 shown in FIG. 9. The bifurcated projection 31 is provided with a radial groove (not shown in FIG. 2 or 3) in which the guide shaft 22 is slidably engaged. This radial groove of the bifurcated projection 31 is similar in shape to a radial groove 77 of a fourth-lens-group support frame (movable element) 70 (see FIG. 9).

Figure 5:
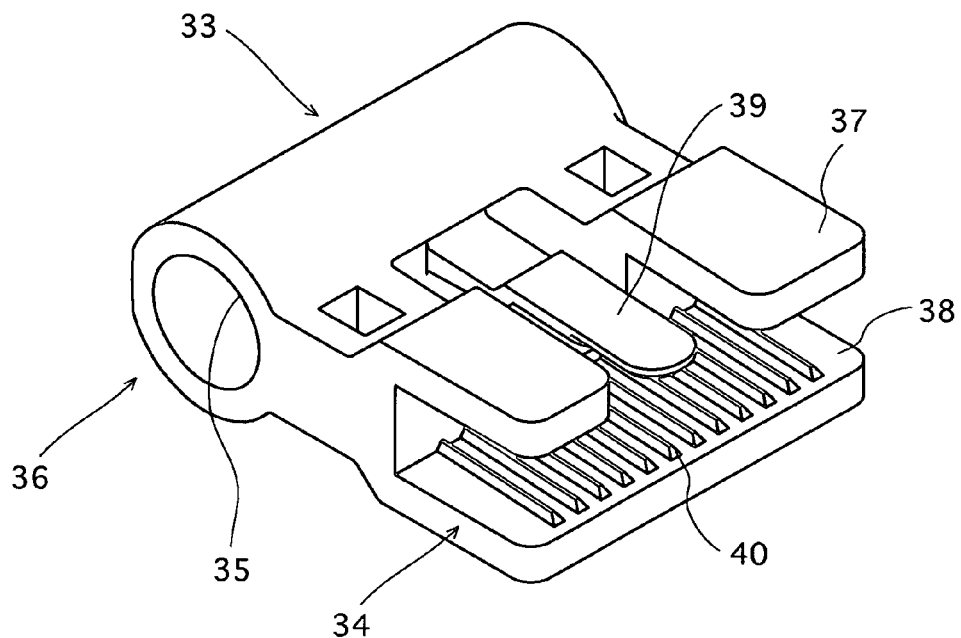
FIG. 5 is a perspective view of a rack-incorporated member of the drive mechanism, viewed obliquely from top thereof.
Figure 6:
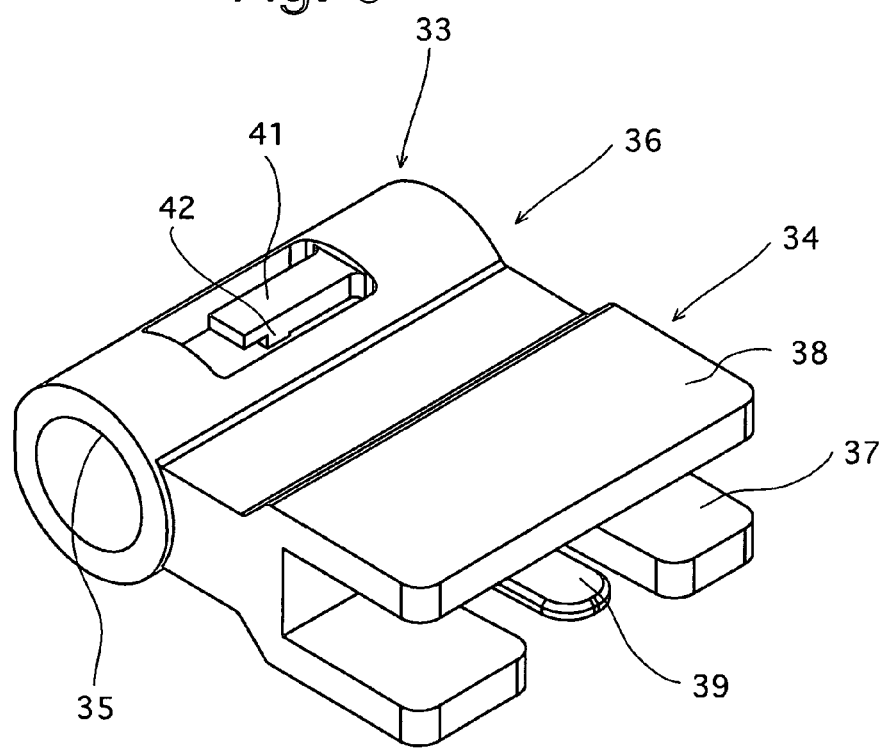
FIG. 6 is a perspective view of a rack-incorporated member of the drive mechanism, viewed obliquely from bottom thereof.
Figure 7:
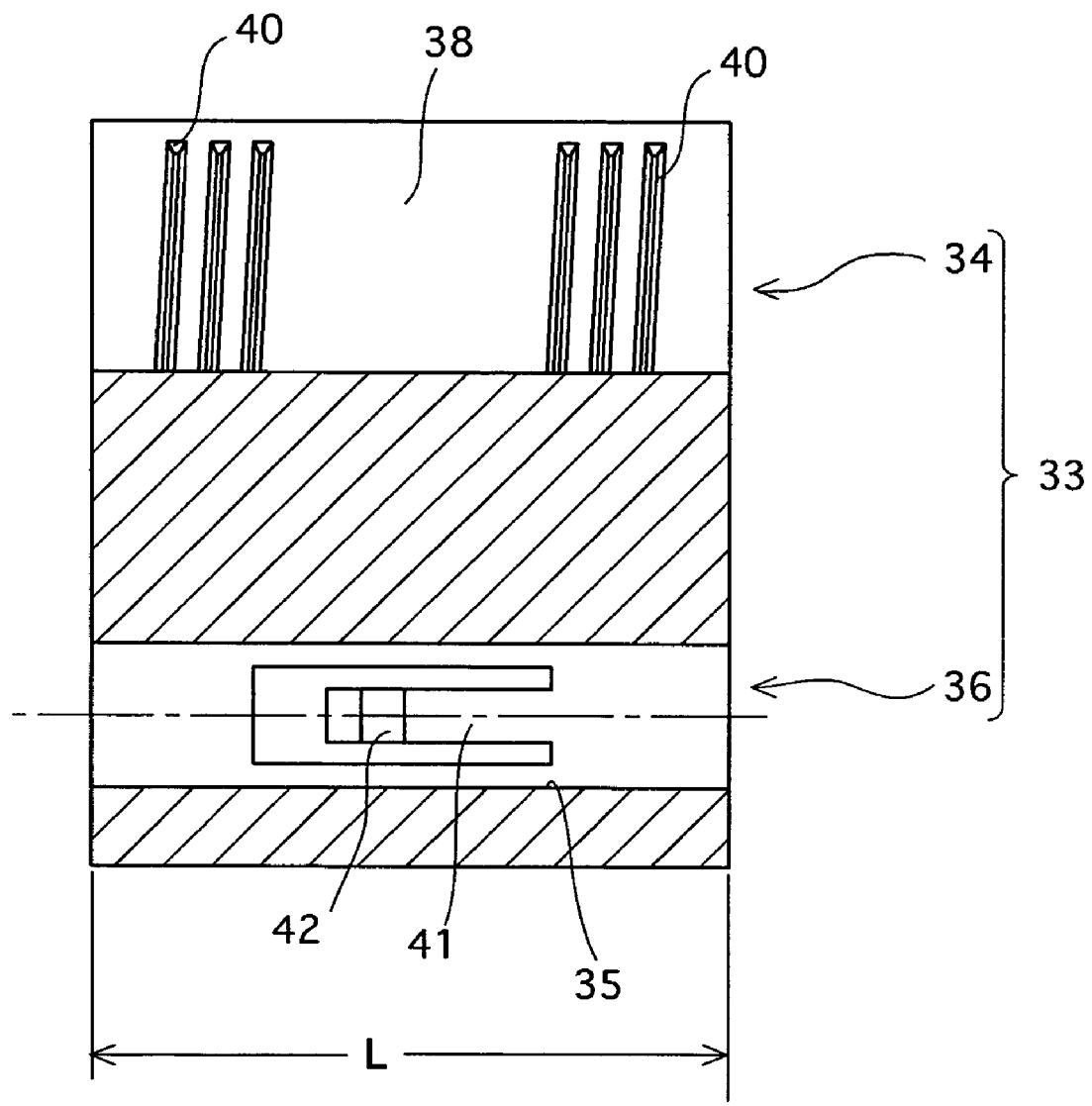
FIG. 7 is a longitudinal sectional view of a rack-incorporated member of the drive mechanism.

The lens barrel 10 is provided between the pair of bearing arms 27 and 28 with a rack-incorporated member (driven member) 33 (see FIG. 5 and 6). The rack-incorporated member 33 is molded from synthetic resin and is provided with a lead-screw engaging portion 34 and a bearing-member insertion portion (engaging portion) 36 which is formed integral with the lead-screw engaging portion 34. The bearing-member insertion portion 36 has a through-hole (guide hole) 35 having a circular shape in cross section into which a hollow-cylindrical bearing member (tubular bearing member) 43 is inserted to be freely slidable in the through-hole 35. The inner diameter of the through-hole 35 is the same as those of the front insertion hole 29 and the rear insertion hole 30 (the through-hole 35 has the same cross sectional shape as the front insertion hole 29 and the rear insertion hole 30), while the length of the bearing-member insertion portion 36 in the forward/rearward direction L (see FIG. 7) is slightly shorter than the inside distance P between the pair of bearing arms 27 and 28 shown in FIG. 4.

As clearly shown in FIGS. 5 and 6, the lead-screw engaging portion 34 has a U-shape in cross section which is open at the side opposite from the bearing-member insertion portion 36 to have two parallel plate portions: upper and lower plate portions 37 and 38 which face each other. A middle part of the upper plate portion 37 has a resilient tongue 39 formed thereat. The lower plate portion 38 is provided, on an inner surface thereof which faces the upper plate portion 37, with teeth (meshing portion) 40 to serve as a rack. A bottom surface of the bearing-member insertion portion 36 has a resilient tongue (resiliently deformable portion) 41 formed therein, which is resiliently deformable in the vertical direction (the vertical direction as viewed in FIG. 6). The resilient tongue 41 is provided on an upper surface (inner surface) thereof with a retaining projection (an element of a retaining device) 42.

The hollow-cylindrical bearing member 43 is made of metal and is provided at a rear end thereof with an annular flange (contacting portion/an element of the retaining device) 44 which projects radially outwards to have a diameter greater than the diameter of the major part of the hollow-cylindrical bearing member 43 and is formed integral therewith. The hollow-cylindrical bearing member 43 is provided on an outer peripheral surface thereof with an annular groove (engaging recess/an element of the retaining device) 45 having its center on the axis of the hollow-cylindrical bearing member 43. The outer peripheral surface of the hollow-cylindrical bearing member 43, except the annular flange 44 and the annular groove 45, is identical in cross sectional shape to each of the front insertion hole 29, the rear insertion hole 30 and the through-hole 35 (i.e., the outer diameter of a cross section of the hollow-cylindrical bearing member 43 is the same as those of the front insertion hole 29, the rear insertion hole 30 and the through-hole 35), and the through-hole 46 of the hollow-cylindrical bearing member 43 is identical in cross sectional shape to the outer peripheral surface of the guide shaft 23 (i.e., the diameter of the guide shaft 23 is substantially the same as the inner diameter of the through-hole 46 of the hollow-cylindrical bearing member 43).

Figure 8:
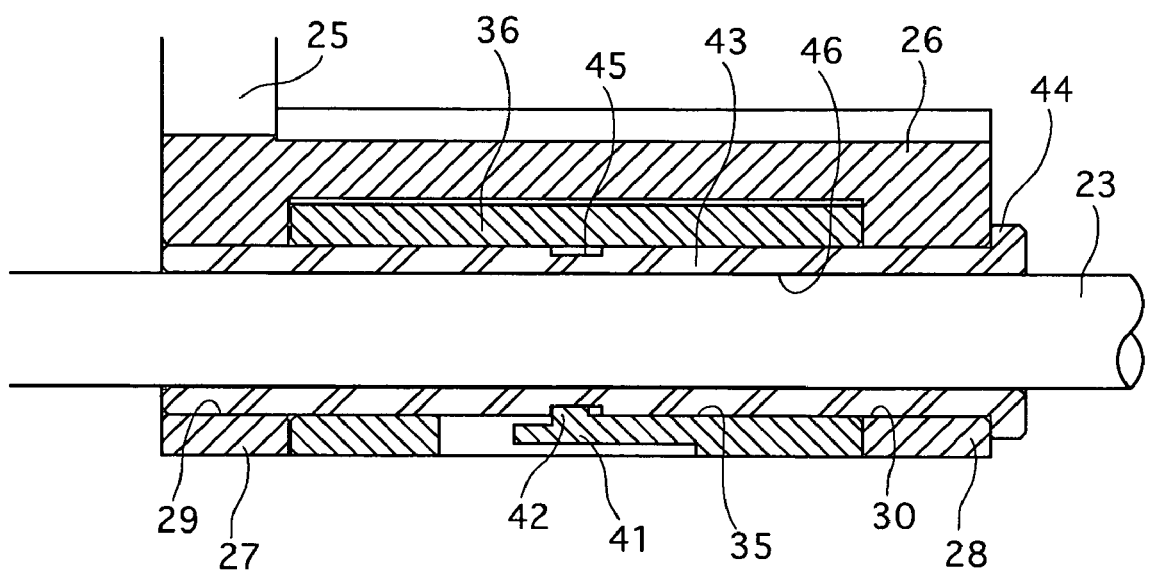
FIG. 8 is an enlarged view of the VIII section shown in FIG. 4.
Figure 9:
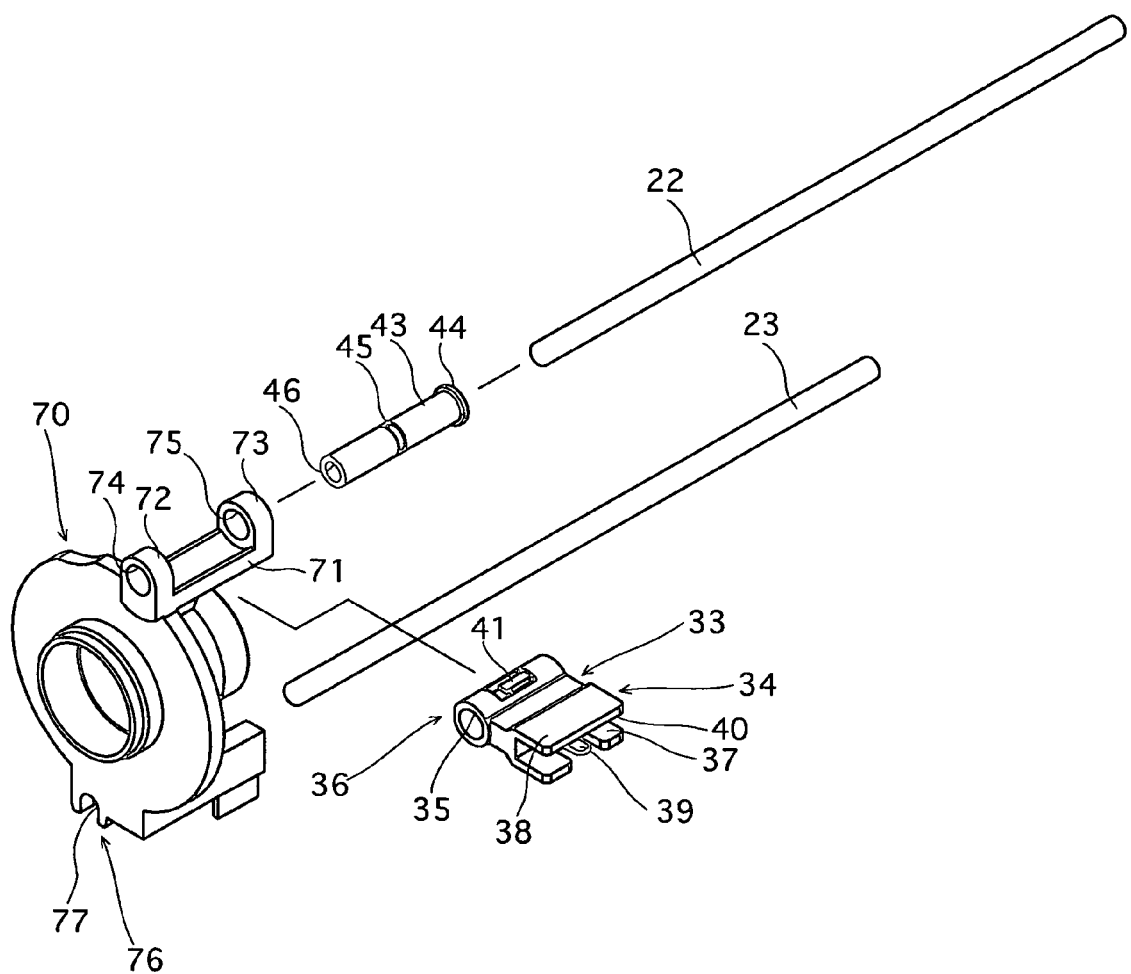
FIG. 9 is an exploded perspective view of a fourth-lens-group support frame and a drive mechanism therefor in the lens barrel shown in FIG. 1.
Figure 11:
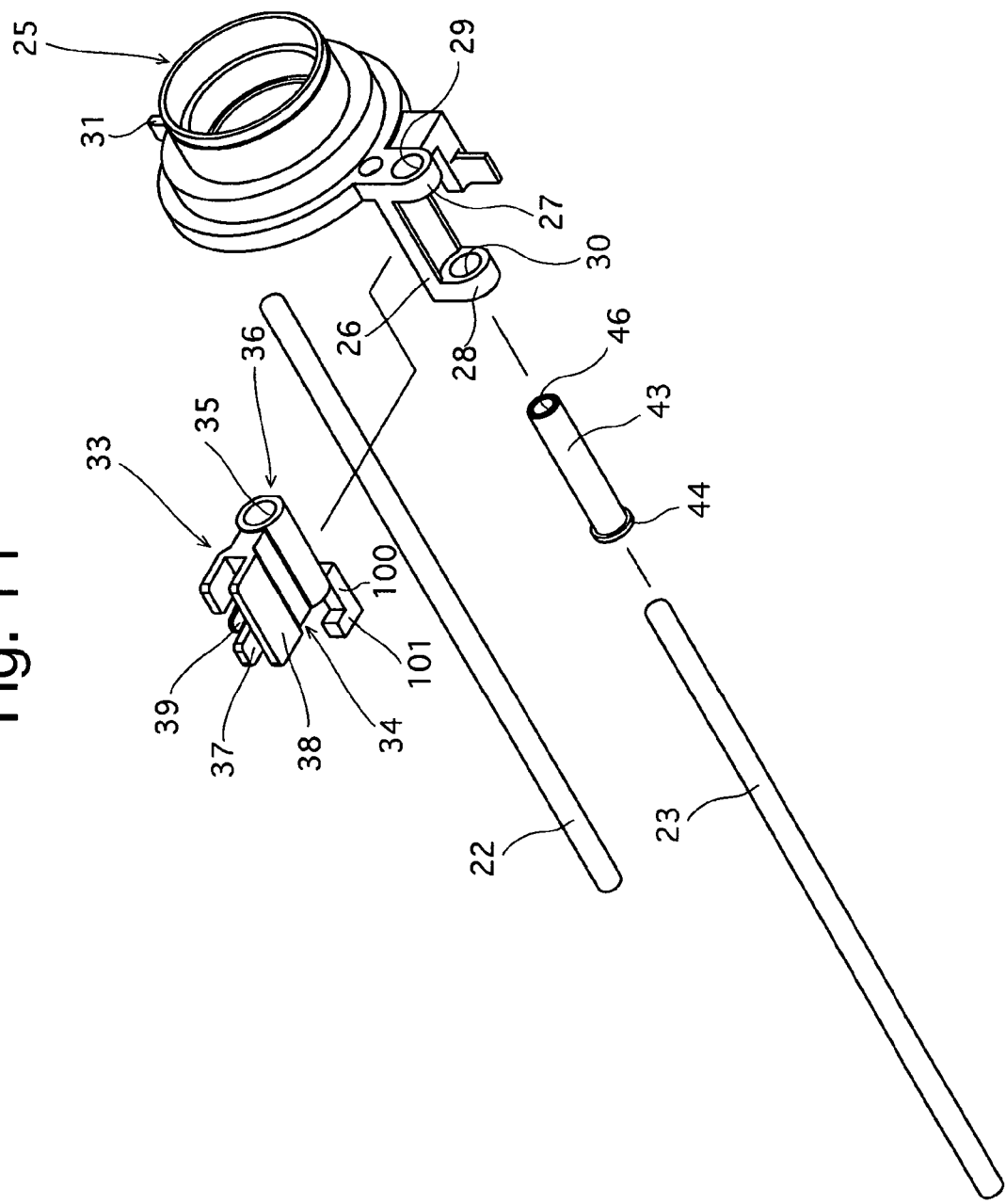
FIG. 11 is a view similar to that of FIG. 3 and illustrates a second-lens-group support frame and a drive mechanism therefor of a second embodiment of the lens drive mechanism to which the present invention is applied.

The bearing-member insertion portion 36 of the rack-incorporated member 33 is positioned between the pair of bearing arms 27 and 28 of the second-lens-group support frame 25 to be movable slightly in the optical axis direction relative to the second-lens-group support frame 25. The hollow-cylindrical bearing member 43 is slidably inserted into the front insertion hole 29, the rear insertion hole 30 and the through-hole 35 while the annular flange 44 is in contact with a rear surface of the bearing arm 28. In a state where the hollow-cylindrical bearing member 43 has been inserted into the front insertion hole 29, the rear insertion hole 30 and the through-hole 35, the through-hole 35 of the bearing-member insertion portion 36 is aligned with the front insertion hole 29 and the rear insertion hole 30. Moreover, the retaining projection 42 of the resilient tongue 41 is resiliently engaged in the annular groove 45 while being in contact with the front wall in the annular groove 45. In addition, the guide shaft 23 is slidably inserted into the through-hole 46 of the hollow-cylindrical bearing member 43. In this manner, the second-lens-group support frame 25 and the rack-incorporated member 33 are joined together via the hollow-cylindrical bearing member 43, while the hollow-cylindrical bearing member 43 is prevented from moving in the forward/rearward direction relative to the pair of bearing arms 27 and 28 via the annular flange 44, the retaining projection 42, and the annular groove 45. In other words, as shown in FIG. 8, the rear surface of the bearing-member insertion portion 36 of the rack-incorporated member 33 is in contact with the front surface of the bearing arm 28, the annular flange 44 is in contact with the rear surface of the bearing arm 28, and the retaining projection 42 is in contact with the front wall in the annular groove 45, and accordingly, the bearing-member insertion portion 36 and the bearing arm 28 are held between the front surface of the annular flange 44 and the front wall in the annular groove 45 in the axial direction of the guide shaft 23 (i.e., in the optical axis direction). Additionally, the hollow-cylindrical bearing member 43 (the outer peripheral surface of which except the annular flange 44 and the annular groove 45 being identical in cross sectional shape to each of the rear insertion hole 30, the through-hole 35 and the front insertion hole 29), is slidably inserted into the rear insertion hole 30, the through-hole 35 and the front insertion hole 29, and hence, the rack-incorporated member 33 is prevented from moving in a direction (lateral direction) orthogonal to the axis of the hollow-cylindrical bearing member 43 (which is parallel to the optical axis O) relative to the pair of bearing arms 27 and 28. Therefore, there is no backlash in the lateral direction between the rack-incorporated member 33 and the pair of bearing arms 27 and 28.

The lens barrel 10 is provided therein with a lead screw (an element of a driving device) 50 and a stepping motor (an element of the driving device) 51. The lead screw 50 extends parallel to the optical axis O and serves as an output shaft of the stepping motor 51. The lead screw 50 is fixed to a bracket 52 fixed to the lens barrel 10 (see FIG. 2). The bracket 52 is U-shaped and is provided with a bottom plate 53 which extends parallel to the lead screw 50 and two side walls 54 and 55 which extend in a direction substantially orthogonal to the bottom plate 53 from front and rear ends thereof, respectively. The stepping motor 51 is fixed to a rear surface of the rear side wall 55. The front end of the lead screw 50 is supported by the front side wall 54 so as to be rotatable on the axis of the lead screw 50. The rear side wall 55 is provided with a through-hole 57 through which the leas screw 50 passes. The pitch angle of the lead screw 50 is identical to the pitch angle of the teeth 40 of the rack-incorporated member 33. As shown in FIG. 2, the teeth 40 and the lead screw 50 are in mesh with each other. In addition, the resilient tongue 39 presses the lead screw 50 toward the lower plate portion 38 to bring tooth flanks of the teeth 40 and screw thread faces of the lead screw 50 into intimate contact with each other, which prevents backlash from occurring between the lead screw 50 and the teeth 40 of the rack-incorporated member 33.

The lens barrel 10 is provided behind the second-lens-group support frame 25 with a third-lens-group support frame 60 which is fitted in the first cylindrical case 11 to be fixed thereto. The third-lens-group support frame 60 supports the third lens group L3.

The lens barrel 10 is provided, in the first cylindrical case 11 behind the third-lens-group support frame 60, with a fourth-lens-group support frame (movable element) 70 which supports the fourth lens group L4. The fourth-lens-group support frame 70 is made of a synthetic resin and installed to be movable in the forward/rearward direction.

The fourth-lens-group support frame 70 is provided with a support arm 71 and a pair of bearing arms 72 and 73 which are identical in shape and size to the support arm 26 and the pair of bearing arms 27 and 28 of the second-lens-group support frame 25 (accordingly, the inside distance between the pair of bearing arms 72 and 73 is identical to the inside distance P between the pair of bearing arms 27 and 28 of the second-lens-group support frame 25), respectively. The pair of bearing arms 72 and 73 are provided with a front insertion hole (guide hole) 74 and a rear insertion hole (guide hole) 75 which correspond to the front insertion hole 29 and the rear insertion hole 30 of the second-lens-group support frame 25, respectively. Namely, the front insertion hole 74 and the rear insertion hole 75 are identical in shape and diameter to the front insertion hole 29 and the rear insertion hole 30 of the second-lens-group support frame 25, respectively (each of the front insertion hole 74 and the rear insertion hole 75 is identical in cross sectional shape to the through-hole 35 of the rack-incorporated member 33). In addition, the fourth-lens-group support frame 70 is provided on a radially opposite side from the support arm 71 with respect to the optical axis O with a bifurcated projection 76 which is formed to correspond to the guide shaft 23. The bifurcated projection 76 is provided with a radial groove 77 in which the guide shaft 23 is slidably engaged.

The lens barrel 10 is provided between the pair of bearing arms 72 and 73 with a rack-incorporated member (driven member) 33 which is the same as the rack-incorporated member 33 provided between the pair of bearing arms 27 and 28 of the second-lens-group support frame 25. In addition, a hollow-cylindrical bearing member 43, which is the same as the above-mentioned hollow cylindrical bearing member 43, is fixed to the second-lens-group support frame 25 and is slidably inserted in a through-hole 35 of the rack-incorporated member 33 provided between the pair of bearing arms 72 and 73 of the fourth-lens-group support frame 70.

The rack-incorporated member 33 and the hollow cylindrical bearing member 43 are mounted to the pair of bearing arms 72 and 73 in the same manner as the rack-incorporated member 33 and the hollow cylindrical bearing member 43 which are mounted to the pair of bearing arms 27 and 28.

In addition, although not shown in the drawings, a lead screw 50 having the same structure as the lead screw 50 shown in FIG. 2 is positioned between upper and lower plate portions 37 and 38 of the rack-incorporated member 33 mounted to the fourth-lens-group support frame 70 (a stepping motor 51 and a bracket 52 which are identical to those shown in FIG. 2 are also provided for the lead screw 50). The lead screw 50 having the same structure as the lead screw 50 shown in FIG. 2 is in mesh with teeth 40 of the rack-incorporated member 33 mounted to the fourth-lens-group support frame 70, in the same manner as that on the second-lens-group support frame 25 side as shown in FIG. 2.

As shown in FIG. 1, the lens barrel 10 is provided, on an inner peripheral surface of the first cylindrical case 11 at the bottom thereof in the vicinity of the second-lens-group support frame 25, with an origin point sensor (photo interrupter) S2, and is further provided, on an inner peripheral surface of the first cylindrical case 11 at the bottom thereof in the vicinity of the fourth-lens-group support frame 70, with an origin point sensor (photo interrupter) S4. The second-lens-group support frame 25 is provided at a lower end thereof with a light-intercepting protrusion 32 which intercepts an infrared ray of light emitted by a light emitter of the origin point sensor S2 so that the origin point sensor S2 senses the origin point of the second-lens-group support frame 25 (the second lens group L2) upon the light-intercepting protrusion 32 passing through (intercepting) the origin point sensor S2, while the fourth-lens-group support frame 70 is provided at a lower end thereof with a light-intercepting protrusion 78 which intercepts an infrared ray of light emitted by a light emitter of the origin point sensor S4 so that the origin point sensor S4 senses the origin point of the fourth-lens-group support frame 70 (the four lens group L4) upon the light-intercepting protrusion 78 passing through (intercepting) the origin point sensor S4.

In the lens drive mechanism of the lens barrel 10 that has the above described structure, rotating the lead screw 50 for driving the second-lens-group support frame 25 (the second lens group L2) forward or reverse causes the front rack-incorporated member 33 (on the second lens group L2 side), which is guided linearly by the guide shafts 22 and 23, to move linearly forward or rearward along the optical axis O via the engagement of the lead screw 50 with the teeth 40 of the lead-screw engaging portion 34 (on the second lens group L2 side).

The second-lens-group support frame 25 and the associated rack-incorporated member 33 move together in the optical axis direction when the lead screw 50 for driving the second-lens-group support frame 25 (the second lens group L2) is rotated. In addition, the hollow-cylindrical bearing member 43 is inserted into the front insertion hole 29, the rear insertion hole 30 and the through-hole 35, which are mutually identical in cross sectional shape, with no backlash and play, while the guide shaft 23 is inserted into the through-hole 46 with no play, and according, backlash and play are eliminated among the second-lens-group support frame 25, the associated rack-incorporated member 33 and the guide shaft 23. Therefore, a positional difference between the second-lens-group support frame 25 and the associated rack-incorporated member 33 relative to the optical axis O, which becomes a cause of decentering and tilting of the optical axis of the second lens group L2, is eliminated (because both the second-lens-group support frame 25 and the associated rack-incorporated member 33 are precisely orientated in the optical axis direction), which prevents the optical performance of the second lens group L2 from deteriorating and further prevents the detection of the origin point of the second-lens-group support frame 25 by the origin point sensor S2 from becoming unstable and difficult.

Likewise, rotating the lead screw 50 for driving the fourth-lens-group support frame 70 (the fourth lens group L4) forward or reverse causes the rear rack-incorporated member 33 (on the fourth lens group L4 side), which is guided linearly by the guide shafts 22 and 23, to move linearly forward or rearward along the optical axis O via the engagement of the lead screw 50 with the teeth 40 of the lead-screw engaging portion 34 (on the fourth lens group L4 side). Therefore, the fourth-lens-group support frame 70 and the associated rack-incorporated member 33 move together in the optical axis direction when the lead screw 50 for driving the fourth-lens-group support frame 70 (the fourth lens group L4) is rotated. In addition, a positional difference between the second-lens-group support frame 70 and the associated rack-incorporated member 33 relative to the optical axis O, which becomes a cause of decentering and tilting of the optical axis of the fourth lens group L4, is eliminated (because both the fourth-lens-group support frame 70 and the associated rack-incorporated member 33 are precisely orientated in the optical axis direction), which prevents the optical performance of the fourth lens group L4 from deteriorating and further prevents the detection of the origin point of the fourth-lens-group support frame 70 by the origin point sensor S4 from becoming unstable and difficult, similar to the second lens group L2 side.

The resilient tongue 41 of each rack-incorporated member 33 is exposed at an outer surface thereof and thus capable of being operated manually. Accordingly, the engagement of the second-lens-group support frame 25 with the front rack-incorporated member 33 and the associated hollow-cylindrical bearing member 43 can be released easily if the resilient tongue 41 of the front rack-incorporated member 33 is resiliently deformed outwards manually to disengage the retaining projection 42 from the annular groove 45. Likewise, the engagement of the fourth-lens-group support frame 70 with the rear rack-incorporated member 33 and the associated hollow-cylindrical bearing member 43 can be released easily if the resilient tongue 41 of the rear rack-incorporated member 33 is resiliently deformed outwards manually to disengage the retaining projection 42 from the annular groove 45.

The second embodiment of the lens drive mechanism to which the present invention is applied will be hereinafter discussed with reference to FIGS. 11 through 14. Elements of the second embodiment of the lens drive mechanism which are similar to those of the first embodiment of the lens drive mechanism are designated by the same reference numerals and descriptions of such elements will be omitted in the following description.

The second embodiment of the lens drive mechanism is different in structure of each rack-incorporated member 33 and the hollow-cylindrical bearing member 43 from the first embodiment of the lens drive mechanism.

Figure 12:
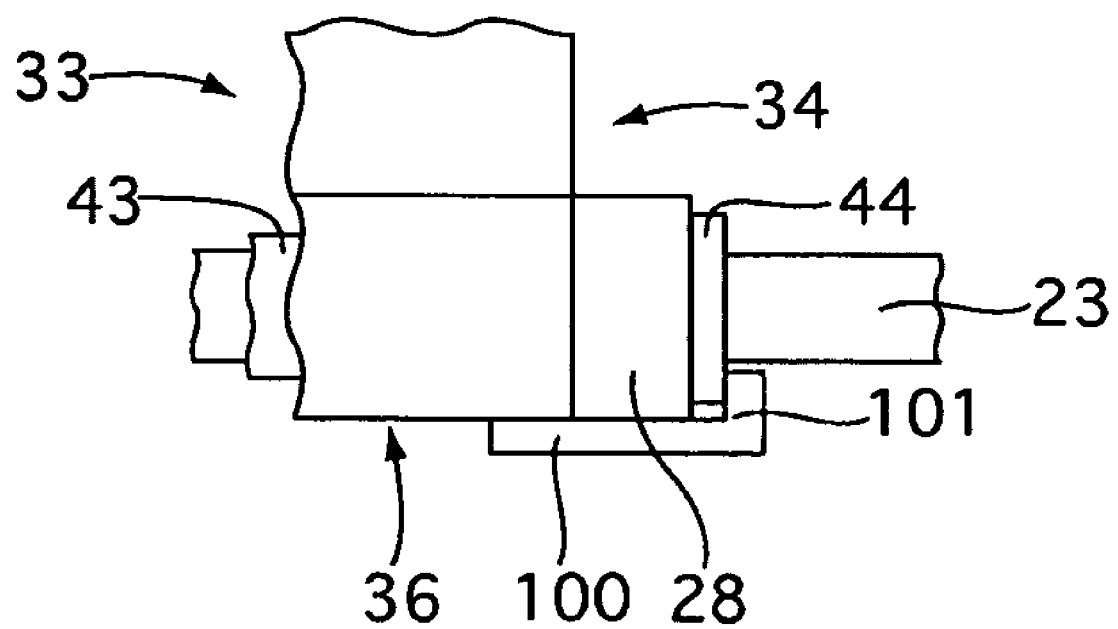
FIG. 12 is a plan view of a retaining device of the second embodiment of the lens drive mechanism on the second lens group side.
Figure 13:
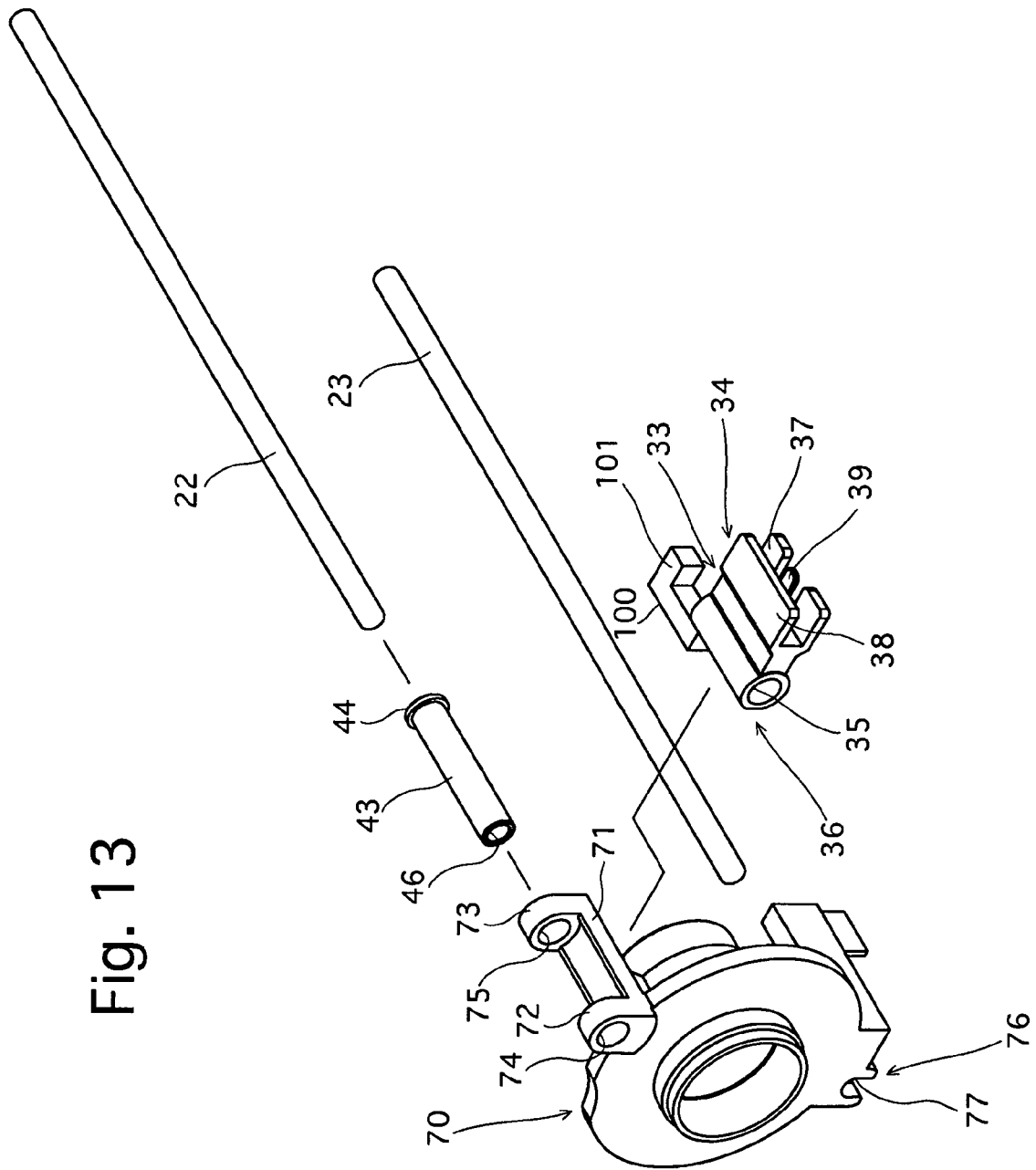
FIG. 13 is a view similar to that of FIG. 9 and illustrates a fourth-lens-group support frame and a drive mechanism therefor of the second embodiment of the lens drive mechanism.
Figure 14:
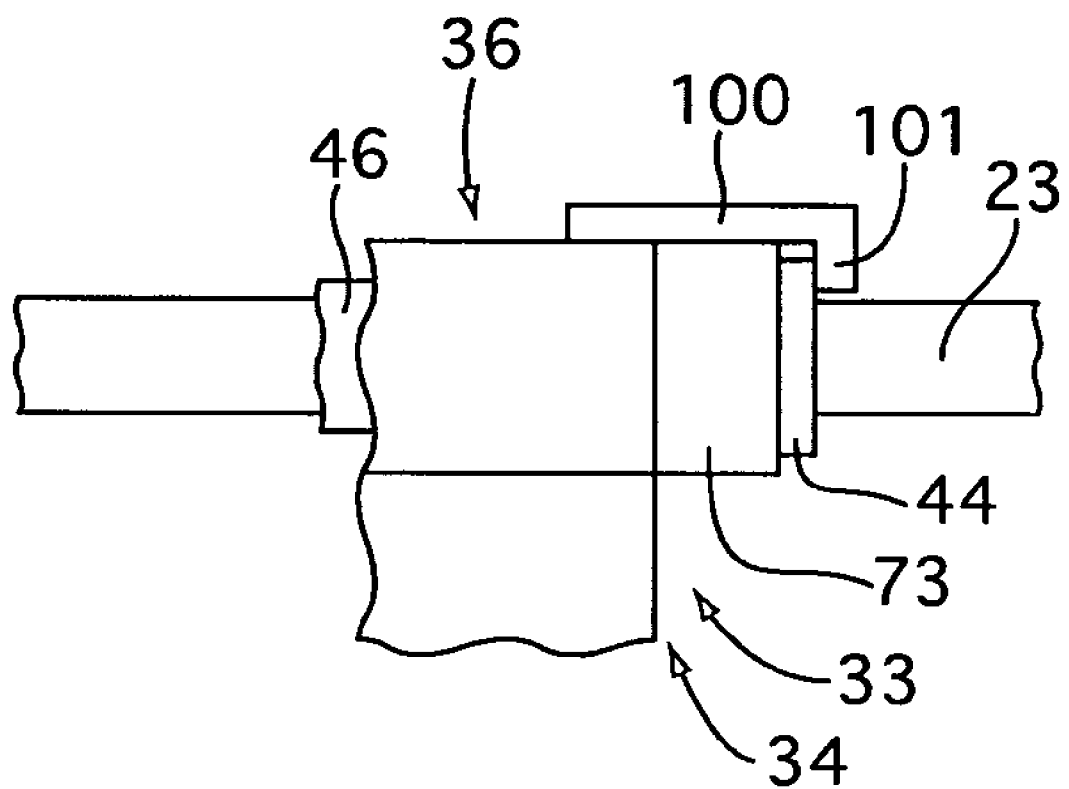
FIG. 14 is a plan view of a retaining device of the second embodiment of the lens drive mechanism on the fourth lens group side.
Figure 15:
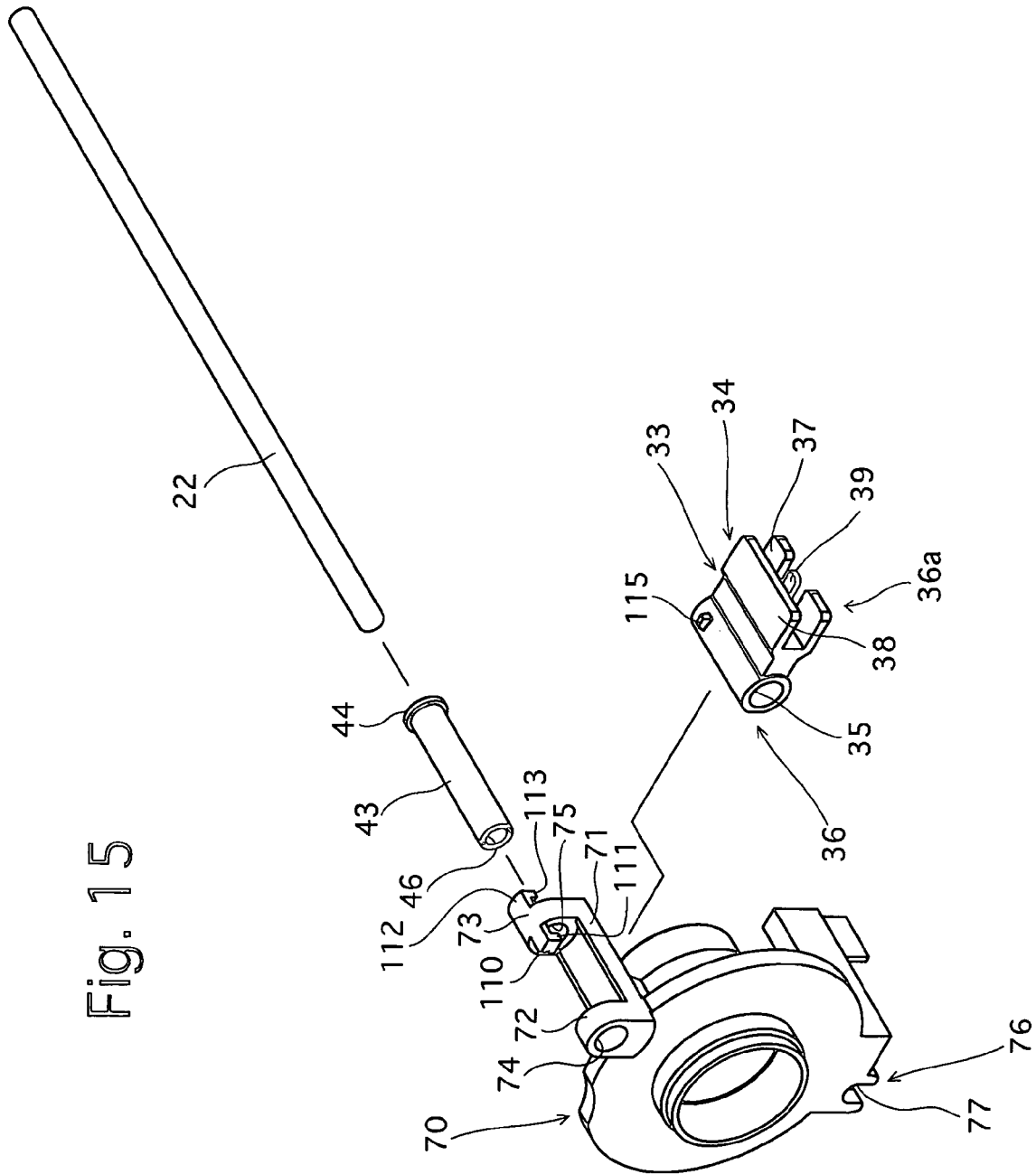
FIG. 15 is an exploded perspective view similar to that of FIG. 13 of a first modified embodiment according to the present invention.
Figure 16:
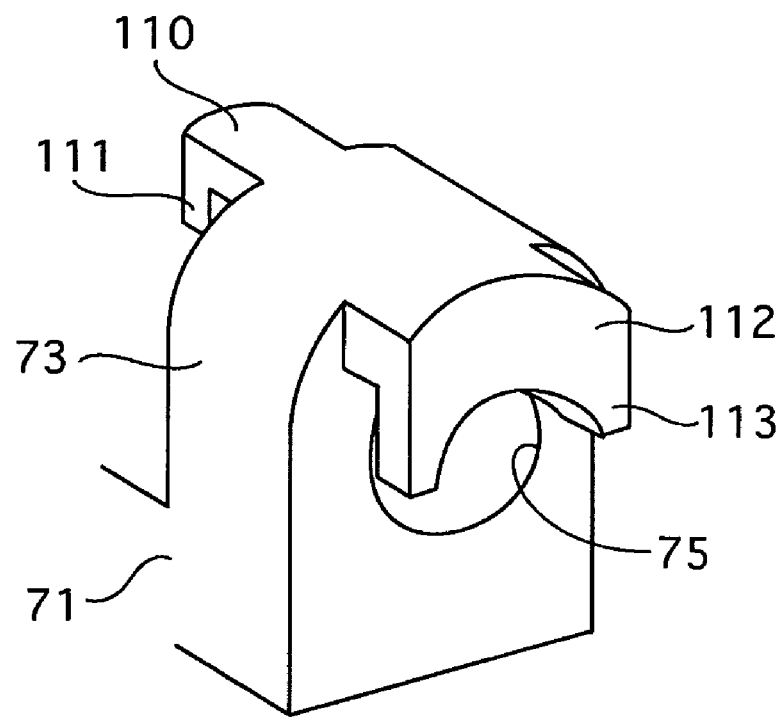
FIG. 16 is an enlarged perspective rear view of a rear bearing arm of the fourth-lens-group support frame.

As shown in FIGS. 11 through 14, the hollow-cylindrical bearing member 43 in the second embodiment of the lens drive mechanism is provided with no annular groove corresponding to the annular groove 45. In addition, each of the front rack-incorporated member 33 and the rear rack-incorporated member 33 is provided with neither a resilient tongue corresponding to the resilient tongue 41 nor an engaging projection corresponding to the retaining projection 42. Instead, each rack-incorporated member 33 is provided on the bearing-member insertion portion 36 thereof with an L-shaped integrally-molded hook (engaging lug) 100 which projects rearwards from a side surface of the bearing-member insertion portion 36. An end of the hook 100 is bent to serve as a retaining portion (an element of the retaining device) 101 which extends in a direction orthogonal to the optical axis O. The retaining portion 101 of the hook 100 of the front rack-incorporated member 33 is in contact with a rear surface of the annular flange 44 of the associated hollow cylindrical bearing member 43 so that the bearing arm 28 and the annular flange 44 are held between the retaining portion 101 and the bearing-member insertion portion 36 of the front rack-incorporated member 33 as shown in FIG. 12, and the retaining portion 101 of the hook 100 of the rear rack-incorporated member 33 is in contact with a rear surface of the annular flange 44 of the associated hollow cylindrical bearing member 43 so that the bearing arm 73 and the annular flange 44 are held between the retaining portion 101 and the bearing-member insertion portion 36 of the rear rack-incorporated member 33 as shown in FIG. 14. Due to this structure, the hollow-cylindrical bearing member 43 is prevented from moving in the optical axis direction relative to the second-lens-group support frame 25 and the front rack-incorporated member 33, and the hollow-cylindrical bearing member 43 is prevented from moving in the optical axis direction relative to the fourth-lens-group support frame 70 and the rear rack-incorporated member 33.

According to the second embodiment of the lens drive mechanism, an effect similar to the effect obtained according to the first embodiment of the lens drive mechanism is obtained.

Although the present invention has been described based on the above described first and second embodiments of the lens drive mechanisms, the present invention can be applied to not only a lens drive mechanism but also a drive mechanism for driving another element. For instance, the present invention can also be applied to a mechanism of a scanner (used for a copier and the like) in which a support member (movable element) that supports a scanner head and a driven member linearly move together along linear guide shafts, and another mechanism of an MD or CD player in which a pick-up member (movable element) and a driven member linearly move together along linear guide shafts.

Although the teeth 40 is formed only on an inner surface of the lower plate portion 38 of each rack-incorporated member 33 in each of the above illustrated first and second embodiments of the lens drive mechanisms, the teeth 40 and other teeth corresponding to the teeth 40 can be formed on an inner surface of the lower plate portion 38 and an inner surface of the upper plate portion 37, respectively.

Although the front insertion hole 29, the rear insertion hole 30, the through-hole 35, the front insertion hole 74 and the rear insertion hole 75 are all circular in cross section, all of these holes can be any other shape in cross section so long as they have the same cross sectional shape and the hollow-cylindrical bearing member 43 is slidably movable in the optical axis direction. Likewise, although the outer peripheral surfaces of the guide shafts 22 and 23 and the through-hole 46 are all circular in cross section, the outer peripheral surfaces of the guide shafts 22 and 23 and the through-hole 46 can have another shape in cross section so long as they have the same cross sectional shape and the hollow-cylindrical bearing member 43 is slidably movable in the optical axis direction.

Furthermore, as shown in FIGS. 15 through 18 of a first modified embodiment, a different type of retaining device can be provided.

An elastically deformable front engaging portion (retaining device) 110 is provided on the front surface of the bearing arm 73, of the fourth-lens-group support frame 70, so as to project therefrom and to have a downward-facing L-shape. A downward-facing end portion of the front engaging portion 110 constitutes a retaining pawl 111. Furthermore, an elastically deformable rear engaging portion (retaining device) 112 is provided on the rear surface of the bearing arm 73, of the fourth-lens-group support frame 70, so as to project therefrom and to have a downward-facing L-shape. The end portion of the of rear engaging portion 112 constitutes a downward-facing arc shaped retaining pawl 113. On the other hand, a upward-facing engaging projection (retaining portion) 115 is provided on the top surface of the bearing-member insertion portion 36, of the rack-incorporated member 33, in the vicinity of the rear end portion thereof so as to project therefrom.

Figure 17:
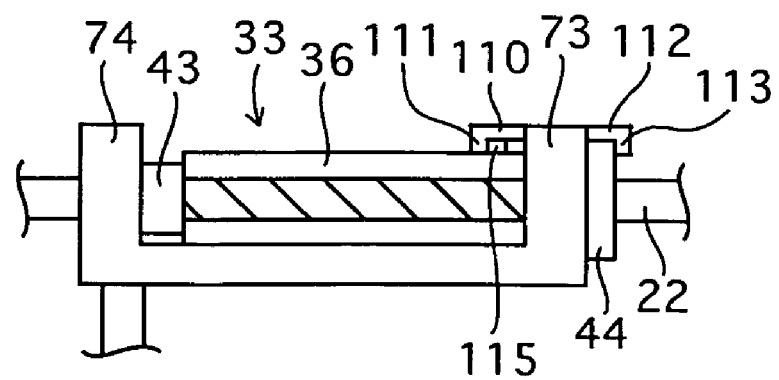
FIG. 17 is a partially sectioned side elevation of an upper end portion of the fourth-lens-group support frame and the vicinity thereof, according to the first modified embodiment of the present invention.
Figure 18:
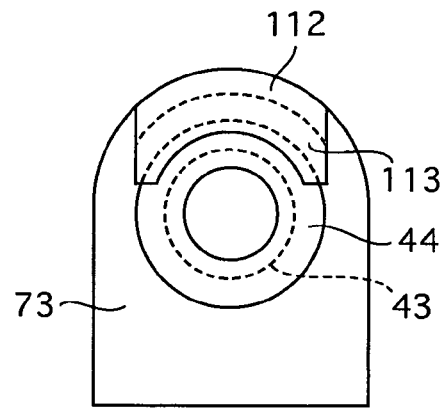
FIG. 18 is a rear view of the upper end portion of the fourth-lens-group support frame and the vicinity thereof.

In the first modified embodiment, when the bearing-member insertion portion 36, of the rack-incorporated member 33, is fitted in between the pair of bearing arms 72 and 73, the engaging projection 115 engages in between the retaining pawl 111 and the front surface of the bearing arm 73 while elastically deforming the front engaging portion 110 (retaining pawl 111). Accordingly, as the engaging projection 115 is engaged in between the retaining pawl 111 and the front surface of the bearing arm 73, since the rear surface of the bearing-member insertion portion 36 abuts against the front surface of the bearing arm 73 and the front surface of the engaging projection 115 abuts against the rear surface of the retaining pawl 111 (as shown in FIG. 17), relative movement in the direction of the optical axis O of the rack-incorporated member 33 (bearing-member insertion portion 36) with respect to the fourth-lens-group support frame 70 is prevented.

The hollow-cylindrical bearing member 43 is inserted through the rear insertion hole 75, the through-hole 35, and the front insertion hole 74 from the rear side of the bearing arm 73 upon the rack-incorporated member 33 being coupled with the fourth-lens-group support frame 70 in the above-described manner. Upon insertion of the hollow-cylindrical bearing member 43, the annular flange 44 is fitted in between the retaining pawl 113 and the rear surface of the bearing arm 73 while elastically deforming the retaining pawl 113. Consequently, as shown in FIG. 17, since the front annular surface of the annular flange (retaining device) 44 abuts against the rear surface of the bearing arm 73 and the front surface of the retaining pawl 113 abuts against the upper portion of the rear surface of the annular flange 44, relative movement in the direction of the optical axis O of the hollow-cylindrical bearing member 43 with respect to the fourth-lens-group support frame 70 is prevented.

Figure 19:
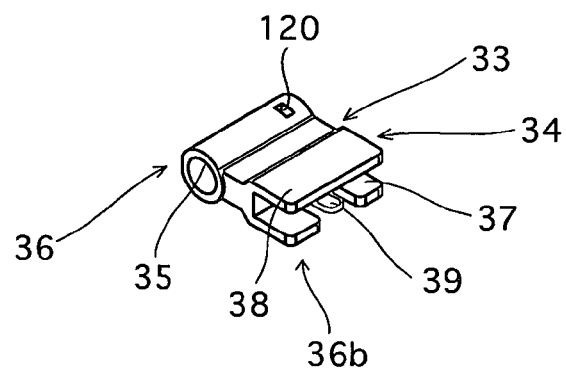
FIG. 19 is a perspective view of a rack-incorporated member according to a second modified embodiment of the present invention.
Figure 20:
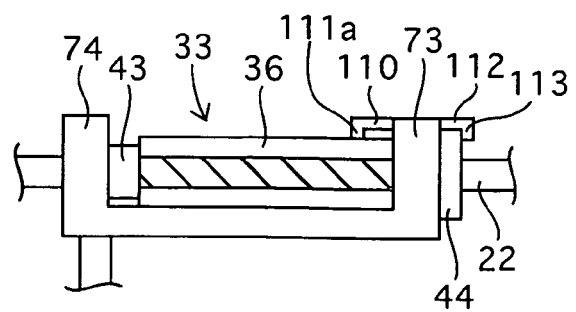
FIG. 20 is a partially sectioned side elevation of an upper end portion of the fourth-lens-group support frame and the vicinity thereof, according to the second modified embodiment of the present invention.

FIGS. 19 and 20 show a second modified embodiment according to the present invention. In the second modified embodiment, instead of an engaging projection 115 being provided on the rack-incorporated member 33, an engaging recess (retaining device) 120 is formed in the top surface of the bearing-member insertion portion 36. Furthermore, a retaining pawl 111a of the second modified embodiment is provided so as to be longer (in the downward direction) than the retaining pawl 111 of the first modified embodiment of FIGS. 15 through 18. Accordingly, in the second modified embodiment, when the bearing-member insertion portion 36 of the rack-incorporated member 33 is fitted in between the pair of bearing arms 72 and 73, the retaining pawl 111a of the front engaging portion 110 elastically deforms while engaging into the engaging recess 120 of the bearing-member insertion portion 36. Since the dimensions of the retaining pawl 111a and the engaging recess 120 are the same in the forward/rearward direction, when the retaining pawl 111a is engaged into the engaging recess 120, relative movement between the rack-incorporated member 33 (bearing-member insertion portion 36) with respect to the fourth-lens-group support frame 70 is prevented.

It should be noted that the first and second modified embodiments can be applied to the second-lens-group support frame 25 in the same manner.

The bearing arm 27 can be omitted from the second-lens-group support frame 25, and likewise, the bearing arm 72 can be omitted from the fourth-lens-group support frame 70, so that the second-lens-group support frame 25 and the fourthlens-group support frame 70 are provided with only the bearing arm 28 and the bearing arm 73, respectively.

Although the present invention has been described based on a lens drive mechanism incorporated in a camera, the present invention can also be applied to optical equipment other than cameras.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A drive mechanism comprising:
   a movable element which has at least one bearing arm;
   a linear guide shaft for linearly guiding said movable element without rotating;
   a driving device which drives said movable element linearly along said linear guide shaft;
   a driven member which is driven, by said driving device, in a direction parallel to said linear guide shaft;
   a first guide hole formed on said bearing arm;
   a second guide hole formed on said driven member, said first guide hole and said second guide hole being identical in size and in cross sectional shape;
   a tubular bearing member fitted into said first guide hole and said second guide hole, said linear guide shaft being fitted completely through said tubular bearing member to be freely slidable therein; and
   a retaining device formed on said tubular bearing member and said driven member to prevent said tubular bearing member from moving relative to said driven member, wherein said retaining device comprises:
   a contacting portion, formed on said tubular bearing member, which comes in contact with said bearing arm on a side opposite from said driven member;
   an engaging recess formed on an outer peripheral surface of said tubular bearing member; and
   a retaining projection formed on said driven member which engages with said engaging recess so that said tubular bearing member is prevented from moving relative to said driven member in said direction of said linear guide shaft.

2. The drive mechanism according to claim 1, wherein said engaging recess of said tubular bearing member is formed around said outer peripheral surface of said tubular bearing member as an annular groove having a center thereof on an axis of said tubular bearing member.

3. The drive mechanism according to claim 1, wherein said tubular bearing member is made of metal.

4. The drive mechanism according to claim 1, wherein said driven member is made of synthetic resin.

5. The drive mechanism according to claim 1, wherein said movable element comprises a lens support frame which supports at least one lens element,
   wherein said bearing arm comprises a pair of bearing arms which are formed on said lens support frame and are separate from each other in a direction parallel to an optical axis of said lens element,
   wherein said driving device comprises a lead screw which extends parallel to said linear guide shaft and which rotates on an axis of said lead screw,
   wherein said driven member comprises a rack-incorporated member which includes an engaging portion positioned between said pair of bearing arms and a rack portion which is in mesh with said lead screw,
   wherein said first guide hole comprises two first guide holes which are formed on said pair of bearing arms, respectively, and said second guide hole is formed on said engaging portion of said rack-incorporated member, said two first guide holes and said second guide hole being aligned in said direction parallel to said optical axis,
   wherein said tubular bearing member is fitted into said two first guide holes and said second guide hole,
   wherein said rack-incorporated member comprises a resiliently deformable portion which is resiliently deformable in a radial direction of said tubular bearing member and which is exposed at an outer surface of said rack-incorporated member, and
   wherein said retaining projection is formed on a surface of said resiliently deformable portion which faces said tubular bearing member.

6. The drive mechanism according to claim 1, wherein said movable element comprises a lens support frame which supports at least one lens element,
   wherein said bearing arm comprises a pair of bearing arms which are formed on said lens support frame and are separate from each other in a direction parallel to an optical axis of said lens element,
   wherein said driving device comprises a lead screw which extends parallel to said linear guide shaft and which rotates on an axis of said lead screw,
   wherein said driven member comprises a rack-incorporated member which includes an engaging portion positioned between said pair of bearing arms and a rack portion which is in mesh with said lead screw,
   wherein said first guide hole comprises two first guide holes which are formed on said pair of bearing arms, respectively, and said second guide hole is formed on said engaging portion of said rack-incorporated member, said two first guide holes and said second guide hole being aligned in said direction parallel to said optical axis,
   wherein said tubular bearing member is fitted into said two first guide holes and said second guide hole,
   wherein said rack portion of said rack-incorporated member has a U-shape in cross section so as to have two parallel plate portions which hold said lead screw therebetween, and
   wherein said lead screw meshes with teeth which are formed on at least one of inner surfaces of said two parallel plate portions which face each other.

7. The drive mechanism according to claim 6, wherein said driven member comprises a resilient tongue formed on one of said two parallel plate portions which presses said lead screw toward the other of said two parallel plate portions on which said teeth are formed to bring tooth flanks of said teeth and screw thread faces of said lead screw into intimate contact with each other.

8. The drive mechanism according to claim 1, wherein said linear guide shaft comprises a pair of linear guide shafts parallel to each other.

9. The drive mechanism according to claim 1, wherein said driving device comprises a motor for rotating a lead screw.

10. The drive mechanism according to claim 1, wherein said drive mechanism is incorporated in a photographing lens barrel.

11. The drive mechanism according to claim 1, wherein said contacting portion comprises an annular flange which projects radially outwards from one end of said tubular bearing member.

* * * * *